US011945707B2

(12) United States Patent
Raspadori et al.

(10) Patent No.: US 11,945,707 B2
(45) Date of Patent: Apr. 2, 2024

(54) APPARATUS FOR REMOVING A FLIP-OFF TYPE PLASTIC CAP FROM A BOTTLE

(71) Applicant: COMECER S.p.A., Castel Bolognese (IT)

(72) Inventors: Nicola Raspadori, Castel Bolognese (IT); Alessandro Brunetti, Castel Bolognese (IT)

(73) Assignee: COMECER S.p.A., Castel Bolognese (IT)

(*) Notice: Subject to any disclaimer, the term of this patent is extended or adjusted under 35 U.S.C. 154(b) by 357 days.

(21) Appl. No.: 17/357,283

(22) Filed: Jun. 24, 2021

(65) Prior Publication Data

US 2021/0403303 A1 Dec. 30, 2021

(30) Foreign Application Priority Data

Jun. 29, 2020 (IT) ........................ 102020000015637

(51) Int. Cl.
*B65B 69/00* (2006.01)
*B67B 7/14* (2006.01)

(52) U.S. Cl.
CPC ................ *B67B 7/14* (2013.01); *B65B 69/00* (2013.01)

(58) Field of Classification Search
CPC .................................. B67B 7/14; B65B 69/00
USPC ........................................................ 53/381.4
See application file for complete search history.

(56) References Cited

U.S. PATENT DOCUMENTS

| | | | | |
|---|---|---|---|---|
| 3,545,174 A * | 12/1970 | Randrup | B67B 7/164 | 81/3.2 |
| 3,972,420 A * | 8/1976 | Stock | B66C 17/06 | 294/906 |
| 4,773,285 A * | 9/1988 | Dionne | B67B 7/164 | 81/3.27 |
| 5,481,946 A * | 1/1996 | Nishikawa | B67B 7/40 | 81/3.2 |
| 5,628,962 A * | 5/1997 | Kanbara | G01N 35/04 | 222/549 |
| 5,826,409 A * | 10/1998 | Slepicka | B67B 7/02 | 53/492 |
| 6,302,172 B1 * | 10/2001 | De Villele | C10M 133/56 | 198/470.1 |
| 6,531,096 B1 * | 3/2003 | Deveney | B65B 69/00 | 422/549 |
| 6,599,476 B1 * | 7/2003 | Watson | G01N 35/10 | 141/69 |
| 6,604,903 B2 * | 8/2003 | Osborne | B67B 7/164 | 81/3.2 |
| 7,159,489 B2 * | 1/2007 | Itoh | G01N 35/02 | 81/3.2 |

(Continued)

FOREIGN PATENT DOCUMENTS

| | | |
|---|---|---|
| EP | 2457550 A1 | 5/2012 |
| WO | 9928724 A1 | 6/1999 |
| WO | 03048025 A1 | 6/2003 |

*Primary Examiner* — Thomas M Wittenschlaeger
*Assistant Examiner* — Katie L Gerth
(74) *Attorney, Agent, or Firm* — Dorsey & Whitney LLP

(57) ABSTRACT

An apparatus for removing a flip-off cap from a bottle for pharmaceutical substances, which enables automating the removal process in a pharmaceutical substance handling line and, at the same time, may be easy and inexpensive to manufacture. In an example the apparatus comprises a removal station in which a cap is removed from the bottle.

15 Claims, 7 Drawing Sheets

(56) References Cited

U.S. PATENT DOCUMENTS

| | | | | |
|---|---|---|---|---|
| 7,409,809 | B1 * | 8/2008 | Degen | B65B 69/00 81/3.2 |
| 8,297,151 | B1 * | 10/2012 | Huppenthal | B67B 7/14 81/3.36 |
| 8,703,056 | B2 * | 4/2014 | Sakairi | G01N 35/025 422/65 |
| 9,052,299 | B2 * | 6/2015 | Jones | G01N 35/04 |
| 9,592,924 | B2 * | 3/2017 | Decio | B65B 43/50 |
| 10,800,565 | B1 * | 10/2020 | Joplin | B65B 7/2835 |
| 2001/0028863 | A1 * | 10/2001 | Kitagawa | G01N 35/00 422/63 |
| 2003/0103839 | A1 * | 6/2003 | Osborne | B65B 69/00 414/411 |
| 2005/0252342 | A1 * | 11/2005 | Itoh | G01N 35/04 81/3.2 |
| 2009/0198208 | A1 * | 8/2009 | Stavsky | B65B 3/003 604/407 |
| 2010/0132511 | A1 * | 6/2010 | Sutton | B67B 7/00 81/3.4 |
| 2015/0298321 | A1 * | 10/2015 | Gross | B25J 15/0475 422/67 |
| 2022/0252629 | A1 * | 8/2022 | Situ | G01N 35/04 |
| 2023/0211992 | A1 * | 7/2023 | Scaglione | B67B 3/20 53/329 |

* cited by examiner

APPARATUS FOR REMOVING A FLIP-OFF TYPE PLASTIC CAP FROM A BOTTLE

CROSS-REFERENCE TO RELATED APPLICATIONS

This patent application claims priority from Italian Patent Application No. 102020000015637 filed on Jun. 29, 2020, the entire disclosure of which is incorporated herein by reference.

TECHNICAL FIELD

The present invention relates to an apparatus for removing a flip-off type plastic cap from a bottle.

In particular, the present invention is applicable, advantageously but not exclusively, in the removal of the flip-off cap from a bottle for containing a powdered substance for pharmaceutical use, to which the following description will explicitly refer without thereby losing generality.

BACKGROUND OF THE INVENTION

Powdered pharmaceutical substances for preparing liquid solutions or pharmaceutical substances that are already liquid are often contained in bottles of the type comprising a ferrule cap, i.e. a rubber plug provided with an outer metal ferrule having a central hole in order to leave a portion of the rubber plug exposed so that said portion can be perforated by a syringe needle.

Typically, the bottle comprises a plastic cap attached in a removable manner to the ferrule cap in order to cover said perforable portion. The cap comprises a lower protuberance pressed internally into the hole of the ferrule so as to be held on the ferrule cap and, at the same time, be manually removable by a pulling movement. Such type of cap is called a flip-off cap. Once the cap has been removed, it is possible to perforate the rubber plug with the needle of a syringe in order to inject a solvent into the bottle and produce a liquid solution in the bottle, for example a drug, or in order to withdraw the solution or to withdraw a liquid substance from the bottle.

In some medical applications, it is necessary to decontaminate the outer surface of the bottle after removing the cap and before perforating the rubber plug with the needle of the syringe. A known process for decontaminating the outer surface of the bottles consists in keeping a large quantity of bottles in an isolated chamber saturated with VHP for a period of time necessary to destroy the microbiological load present on the outer surface of the bottles.

In order to integrate the bottle decontamination cycle in a pharmaceutical substance handling line, it is necessary to automate the filling of the isolated chamber. However, the flip-off caps were created to be opened manually and an apparatus capable of replacing the manual opening without damaging the ferrule cap or the bottle is not known.

SUMMARY OF THE INVENTION

The object of the present invention is to provide an apparatus for removing a flip-off cap from a bottle for pharmaceutical substances, which apparatus enables automating the removal process in a pharmaceutical substance handling line and, at the same time, is easy and inexpensive to manufacture.

In accordance with the present invention, an apparatus for removing a flip-off type plastic cap from a bottle is provided, as defined in the appended claims.

BRIEF DESCRIPTION OF THE DRAWINGS

The present invention will now be described with reference to the accompanying drawings, which illustrate a non-limiting embodiment example thereof, wherein.

DETAILED DESCRIPTION OF THE INVENTION

Figure 1:
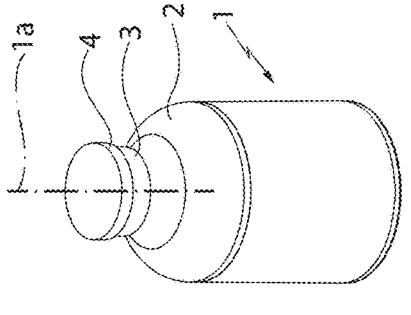
FIG. 1 illustrates a bottle with a flip-off type plastic cap.

In FIG. 1, reference numeral 1 indicates a bottle with a flip-off type cap. The bottle 1 comprises a neck 2 having an access opening (not illustrated), a ferrule cap 3 fixed to the neck 2 for closing the access opening, and a flip-off type plastic cap 4 attached in a removable manner to the ferrule cap 3. The neck 2, the ferrule cap 3 and the cap 4 are coaxial with a longitudinal axis 1*a* of the bottle 1.

Figure 2:
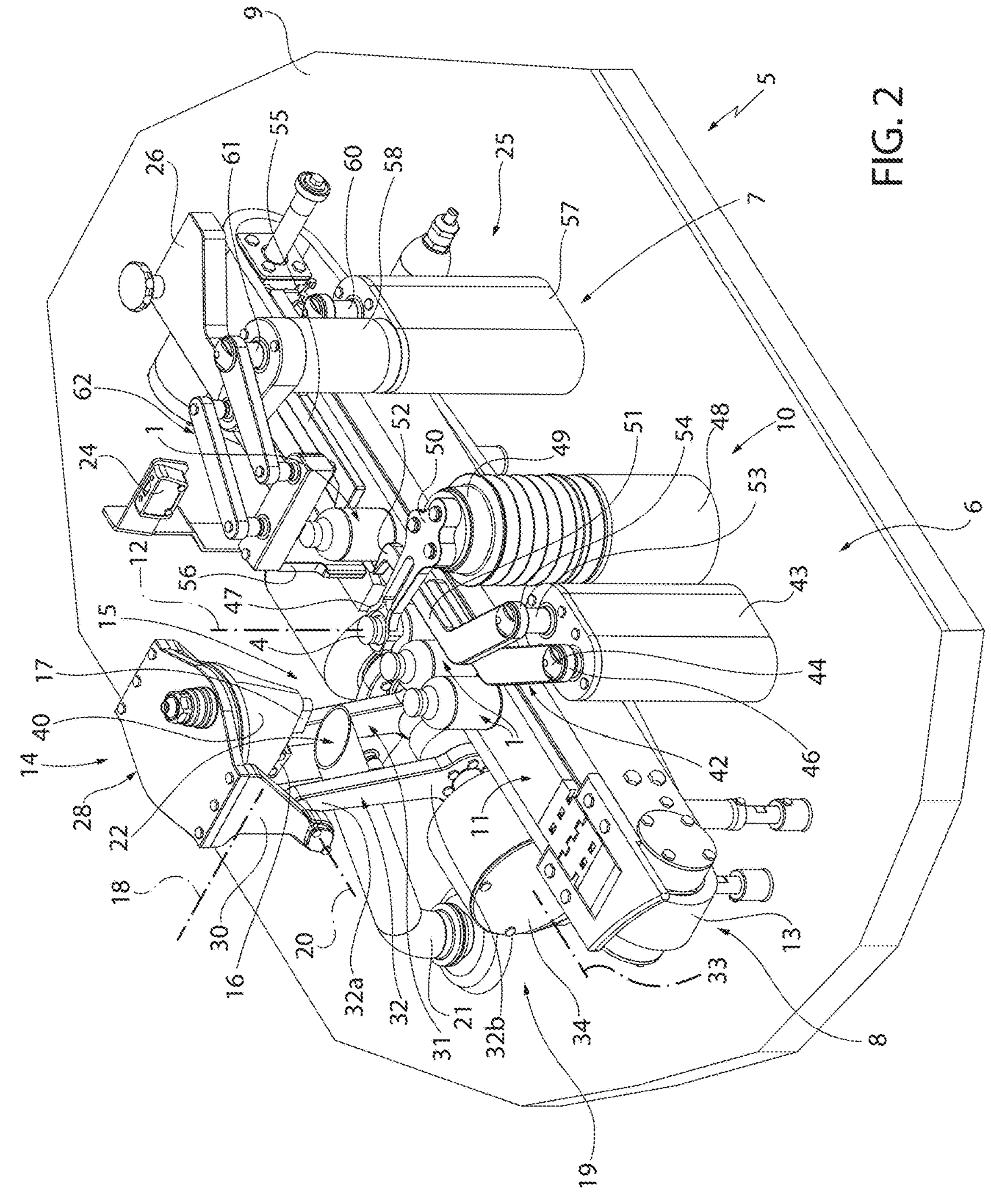
FIGS. 2 and 3 illustrate two different axonometric views of an apparatus for removing the cap from the bottle of FIG. 1, which apparatus is provided according to the principles of the present invention.
Figure 3:
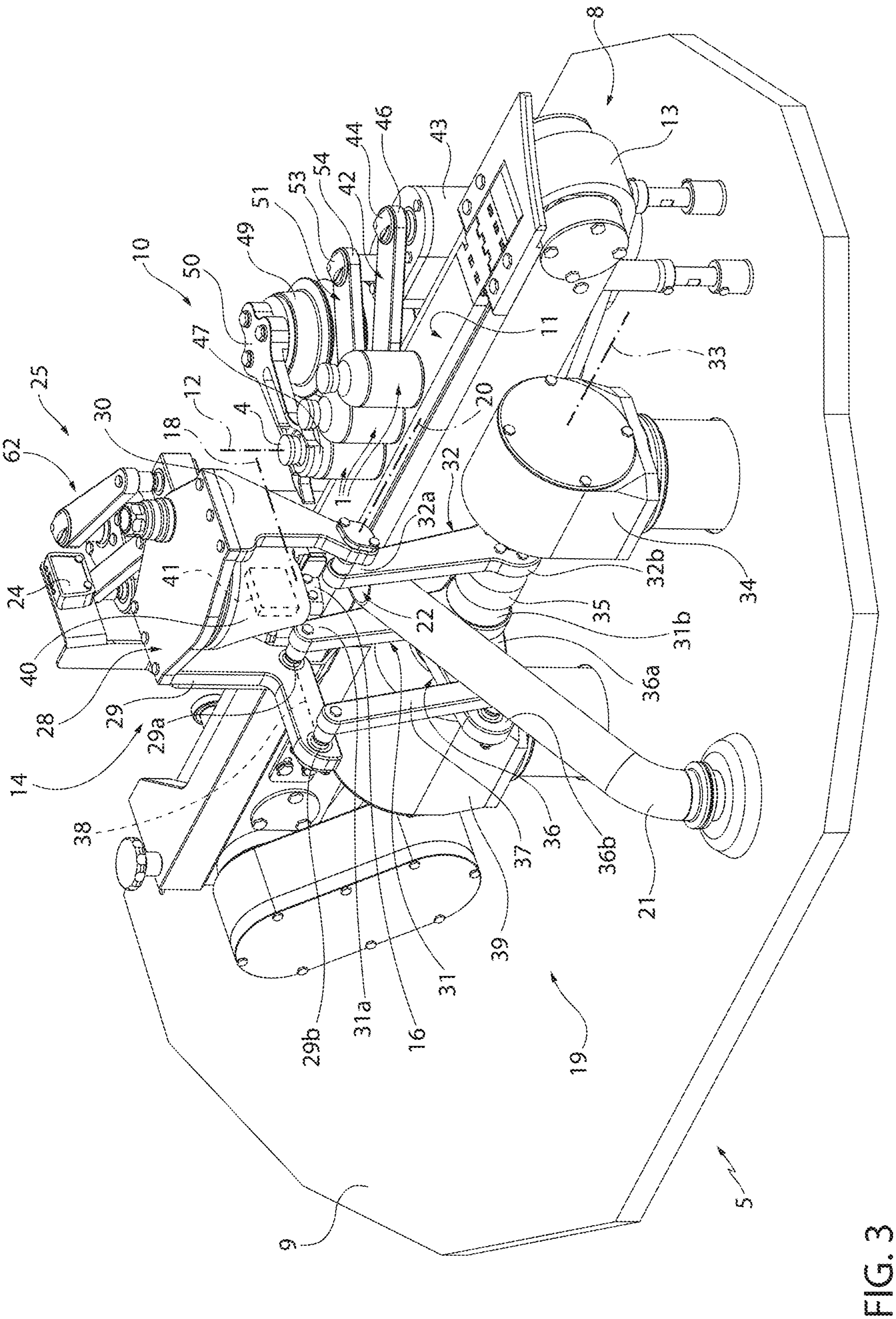
Figure 4:
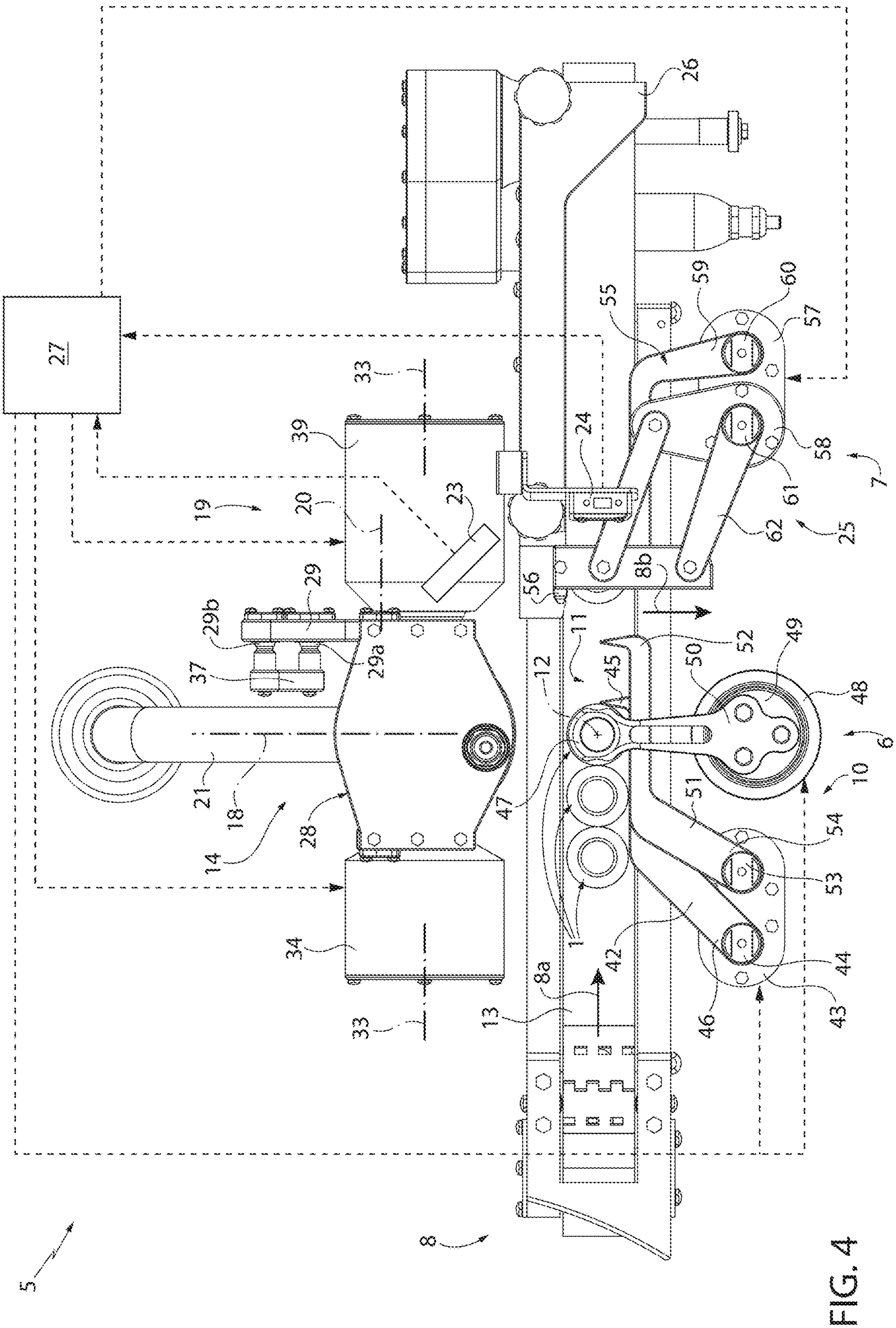
FIG. 4 illustrates a plan top view of the apparatus of FIGS. 2 and 3.

In FIGS. 2 to 4, reference numeral 5 indicates in generic terms, as a whole, an apparatus for removing the flip-off type plastic cap 4 from the bottle 1. FIGS. 2 to 4 illustrate several bottles 1 from which the respective caps 4 are to be removed.

The apparatus 5 comprises a removal station 6, in which the cap 4 is removed from the respective bottle 1, a following discard station 7, in which a potential defective bottle 1 is intercepted and discarded after the removal of the cap 4, and a belt conveyor 8, which runs through the removal station 6 and the discard station 7 in order to convey the bottles 1 in a continuous manner according to an advancing direction 8*a* (FIG. 3) guided from the removal station 6 to the discard station 7. In other words, the belt conveyor 8 feeds the bottles 1 with the respective caps 4 to the removal station 6, transfers each bottle 1 without the cap 4 from the removal station 6 to the discard station 7 and transports the checked bottle 1 out of the discard station 7.

The apparatus 5 comprises a support base 9 on which the belt conveyor 8 and other devices of the removal station 6 and of the discard station 7, described in the following, are attached.

The removal station 6 comprises a holding system 10 for holding one bottle 1 at a time in a cap removal position, where the bottle 1 stands on a supporting surface 11 in the removal station 6 with its longitudinal axis 2*a* coinciding with an axis 12 fixed with respect to the removal station 6, and in particular fixed with respect to the support base 9. Preferably, the axis 12 is perpendicular to the supporting surface 11. Preferably, the axis 12 is vertical. The supporting surface 11 is defined by the upper portion of the looped belt 13 of the belt conveyor 8. The holding system 10 holds the bottle 1 in the cap removal position for at least a time necessary to remove the cap from the bottle, while the belt conveyor 8 continuously moves the looped belt 13, which thus drags underneath the stationary bottle 1.

The removal station 6 comprises a gripping head 14 provided with a gripper 15 having two jaws 16 and 17 mutually movable along an axis 18 transverse to the fixed axis 12 to grip the cap 4 when the bottle 1 is in the cap removal position.

The removal station 6 comprises a handling system 19 to move the gripping head 14 to and from the bottle 1 in the cap removal position and to rotate the gripping head 14 about a further axis 20 located on the side of the jaw 16 and perpendicular to a geometric plane defined by the axis 12 and by the axis 18.

Advantageously, the axis 12 is vertical, therefore said plane is vertical and thus the axis 20 is horizontal.

The removal station 6 further comprises a discharging pipe 21 anchored to the support base 9 and having an inlet port 22 facing upwards. The handling system 19 is suited to move the gripping head 14 between a first position, in which the gripper 15 is above the bottle 1 in the cap removal position in order to remove the cap 4, and a second position, which is the one illustrated by FIGS. 2 to 4, in which the gripper 15 is above the inlet port 22 to discharge the cap 4 by gravity, i.e. let the cap 4 fall into the discharging pipe 21 through the inlet port 22.

The removal station 6 finally comprises an image acquisition device, which is of a known type, is schematically illustrated only in FIG. 4 for simplicity and indicated by 23, and is placed so as to acquire a side image of each bottle 1 after the respective cap 4 has been removed.

The discard station 7 comprises an optical sensor 24 placed above the belt conveyor 8 and oriented downwards in order to detect the passing of each bottle 1 in the discard station 7 and an interception and handling system 25 for removing the detected bottle 1 from the belt conveyor 8, by moving it in a discard direction 8*b* (FIG. 3) transverse to the advancing direction 8*a* so as to transfer the bottle 1 into a discard collector (not illustrated) on the side of the belt conveyor 8, in the event that the image of the bottle 1 shows a defect, for example the cap 4 has not been removed or the ferrule cap 3 is damaged.

The belt conveyor 8 comprises a guide 26 placed at the outlet of the discard station 7 and shaped to divert the bottles 1 without a cap 4 and which are not discarded to subsequent means (not illustrated) for conveying or handling or processing (for example, decontaminating) or using the bottles 1 without the respective caps 4.

The apparatus 5 further comprises an electronic control unit, schematically illustrated only in FIG. 4 for simplicity and indicated by 27, to control the holding system 10, the gripper 15, the handling system 19, the image acquisition device 23 and the interception and handling system 25 according to a precise time coordination. Moreover, the electronic control unit 27 is configured to process each bottle image acquired by the image acquisition device 23 in order to verify whether or not the cap is present and control the interception and handling system 25 in order to discard the bottle 1 if the processing of the corresponding image detects the presence of the cap 4.

More specifically, still with reference to FIGS. 2 to 4, the gripping head 14 comprises a frame 28 having at least one side portion, and in particular two side portions 29 and 30 placed on opposite sides of the axis 18, and the handling system 19 comprises at least one support arm, and in particular two support arms 31 and 32, each having a first end 31*a*, 32*a* articulated, by means of a pivot-bearing joint, at a point of a corresponding side portion 29, 30 in order to allow the rotation of the gripping head 14 about the axis 20, and the other end 31*b*, 32*b* connected to the support base 9 so as to rotate around another axis 33 fixed with respect to the support base 9 to allow the gripping head 14 to move to and from the bottle.

The articulation point of the support arm 31 with the gripping head 14, and in particular with the side portion 29 of the frame 28, is indicated by 29*a* in FIG. 3.

Advantageously, the axis 33 is perpendicular to said plane defined by the axis 12 and by the axis 18. In other words, the axis 33 is parallel to the axis 20.

With particular reference to FIGS. 3 and 4, the handling system 19 comprises an electric motor 34, which is fixed to the support base 9 and is suited to rotate its own shaft 35 around the axis 33, and the ends 31*b* and 32*b* of the two support arms 31 and 32 are fitted on the shaft 35. In other words, the end 31*b*, 32*b* of each arm 31, 32 is connected in a rotating manner to the support base 9 by means of the electric motor 34. The electric motor 34 is controlled by the electronic control unit 27.

With particular reference to FIG. 3, the handling system 19 comprises another arm 36, which has one end 36*a* connected to the support base 9 so as to rotate about the axis 33 independently of the support arms 31 and 32, and a further arm 37, which connects in an articulated manner, and in particular by means of two pivot-bearing joints, the other end 36*b* of the arm 36 to a point 29*b* of the side portion 29 so that a rotation of the arm 36 about the axis 33 produces a corresponding rotation of the gripping head 14 about the axis 20. Preferably, the point 29*a* and the point 29*b* of the side portion 29, where the support arm 31 and the arm 37 are respectively articulated, define a segment 38 parallel to the axis 18. The support arm 31, the arm 37, the arm 36 and the segment 38 form an articulated parallelogram in which the arms 31 and 37 are parallel to each other and the arm 36 is parallel to the segment 38.

The handling system 19 comprises a further electric motor 39, which is fixed to the support base and is suited to rotate its own shaft (not visible in the figures) about the axis 33, and the end 36*a* of the arm 36 is fitted on the shaft of the electric motor 39. In other words, the end 36*a* is connected in a rotating manner to the support base 9 by means of the electric motor 39. In order to increase the stability of the handling system 19, and simultaneously keep the rotation of the arm 36 independent of the rotation of the support arms 31 and 32, the shaft of the motor 39 is coupled coaxially and in a disengaged manner to the shaft 35 of the motor 34. The electric motor 39 is controlled by the electronic control unit 27.

The gripping head 14 comprises a box-like body 40, visible in FIGS. 2 and 3, supported by the frame 28 and housing an electric actuator 41 (FIG. 4), which is suited to close and open the gripper 15. The electric actuator 41 is controlled by the electronic control unit 27.

Still with reference to FIGS. 2 to 4, the holding system 10 comprises an intercepting body 42, which is movable to and from an intercepting position, which is the position illustrated in FIGS. 2 to 4, wherein the intercepting body 42 is placed on or above the supporting surface 11 transversely to the advancing direction 8*a* to stop the bottle 1 in the cap removal position, while the belt conveyor 8 tends to advance the bottle 1 in the advancing direction 8*a*, making the looped belt 13 drag on the bottom of the stationary bottle 1. Normally, the belt conveyor 8 transports a plurality of bottles 1, as illustrated in FIGS. 2 to 4, consequently the bottles 1 behind the one intercepted by the intercepting body 42 stop against the intercepted bottle 1 and the looped belt 13 drags underneath them.

More specifically, the holding system 10 comprises an electric actuator 43, which is fixed to the support base 9 and comprises a shaft 44 rotating about a vertical axis, and the intercepting body 42 consists of an arm, which has an L-shaped first portion 45 (FIG. 4) for intercepting the bottle 1 and a second portion 46 fitted on the shaft 44. The electric actuator 44 is suited to rotate the shaft 44 between two angular positions such to move the intercepting body 42 to and from said intercepting position. The electric actuator 43 is controlled by the electronic control unit 27.

The holding system 10 further comprises a ring 47, which is movable coaxially to the axis 12 between a raised position, in which the ring 47 is above the ferrule cap 3 of the bottle 1 in order to leave the bottle 1 free, and thus allow the conveyance of the bottles 1 in the advancing direction 8*a*, and a lowered position, illustrated by FIGS. 2 to 4, in which the ring 47 is fitted around the neck 2 of the bottle 1 to retain the latter in the cap removal position.

More specifically, the holding system 10 comprises an actuator 48, preferably of electro-pneumatic type, which is fixed to the support base 9 and comprises a vertically movable head 49, and the ring 47 is fixed to the head 49 by means of a support arm 50. The actuator 48 is suited to move the head 49 so that the ring 47 moves between said raised position and said lowered position.

The holding system 10 further comprises a second intercepting body 51, which substantially has the same shape and the same mobility as the intercepting body 42, partially overlaps the intercepting body 42, and is placed with its own L-shaped first portion 52 (FIG. 4) in a more advanced position with respect to the portion 45, in the advancing direction 8*a*, having such an amount that the portion 52 is suited to intercept and stop only the bottle 1 that has already had its cap removed and that precedes the bottle 1 in the cap removal position. The electric actuator 43 comprises a further shaft 53, which is parallel to the shaft 44 and rotates about a vertical axis, and the intercepting body 51 has a second portion 54 fitted on the shaft 53. The electric actuator 44 is suited to rotate the shaft 53 between two angular positions such to move the intercepting body 53 to and from its own intercepting position in order to stop the bottle 1 that has already had its cap removed and that precedes the bottle 1 in the cap removal position.

The movement of the intercepting body 51 is synchronized with the movement of the intercepting body 42 so as to delay the entry of the bottle 1 whose cap has just been removed into the discard station 7 in order to allow the potential discard of the preceding bottle 1. In particular, the movement of the intercepting body 51 to and from its intercepting position occurs with a predefined delay with respect to the movement of the intercepting body 42 to and from its intercepting position.

The synchronization between the two intercepting bodies 42 and 51 is operated by mechanical means (not illustrated) which couple the two shafts 44 and 53 kinematically and which are housed in the actuator 43, or, according to a further embodiment, is operated by the electronic control unit 27 by controlling two different electric motors which move the two shafts 44 and 53 and which are housed in the body of the actuator 43.

Still with reference to FIGS. 2 to 4, the interception and handling system 25 of the discard station 7 comprises an intercepting body 55, which is movable to and from an intercepting position, which is the one illustrated in FIG. 4, wherein the intercepting body 55 is placed on or above the supporting surface 11 transversely to the advancing direction 8*a* to stop the bottle 1 detected by the optical sensor 24, and a pusher 56, which is normally placed on the side the belt conveyor 8, as illustrated in FIG. 4, and is suited to move back and forth across it in the discard direction 8*b* to remove the bottle 1 from the belt conveyor 8 while the intercepting body 55 prevents the bottle 1 from being transported by the belt conveyor 8.

The interception and handling system 25 comprises two electric actuators 57 and 58 both fixed to the support base 9, the first being suited to move the intercepting body 55 and the second being suited to move the pusher 56. In particular, the intercepting body 55 consists of an L-shaped arm having one end 59 (FIG. 4) fixed to a rotating shaft 60 of the actuator 57, the latter being suited to rotate the shaft 60 between two angular positions such to move the intercepting body 55 to and from its intercepting position. The pusher 56 is connected to a rotating shaft 61 of the actuator 58 by means of an articulated parallelogram 62 so that an angular movement of the shaft 61 is transformed into a translation of the pusher 56.

The electric actuators 57 and 58 are controlled by the electronic control unit 27. With the purpose of removing the cap 4 from the bottle 1, the electronic control unit 27 is configured to control the motors 34 and 39 of the handling system 19 and the actuator 41 of the gripping head 14 in the manner described in the following with particular reference to FIGS. 5 to 11, which illustrate the apparatus 5 during respective operating steps and according to a same side view, and in particular from the outlet side of the removal station 6, wherein the discard station 7 has been removed for greater clarity.

Figure 5:
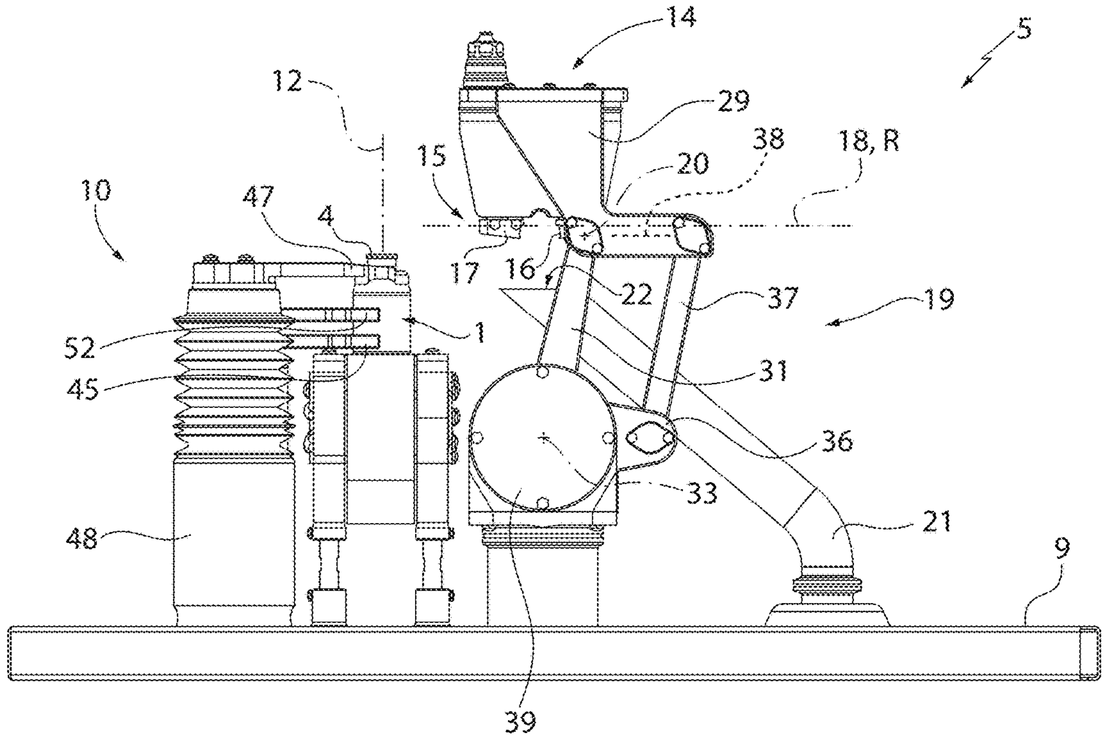
FIGS. 5 to 11 illustrate, according to a side view and with some parts removed, the apparatus of FIGS. 2 and 3 during respective operating steps.

In the operating steps illustrated by FIGS. 5 to 11, the holding system 10 holds a bottle 1 in the cap removal position. The gripping head 14 is initially placed over the discharging pipe 21 with the gripper 15 open and the axis 18 of movement of the gripper 15 preferably perpendicular to the axis 12 (FIG. 5). The initial position of the axis 18 identifies a reference direction indicated by R in FIGS. 5 to 10. Preferably, the axis 12 is vertical and, consequently, the axis 18 is initially horizontal. Preferably, the axis of the arm 36 is also initially horizontal (parallel to the reference direction R).

Figure 6:
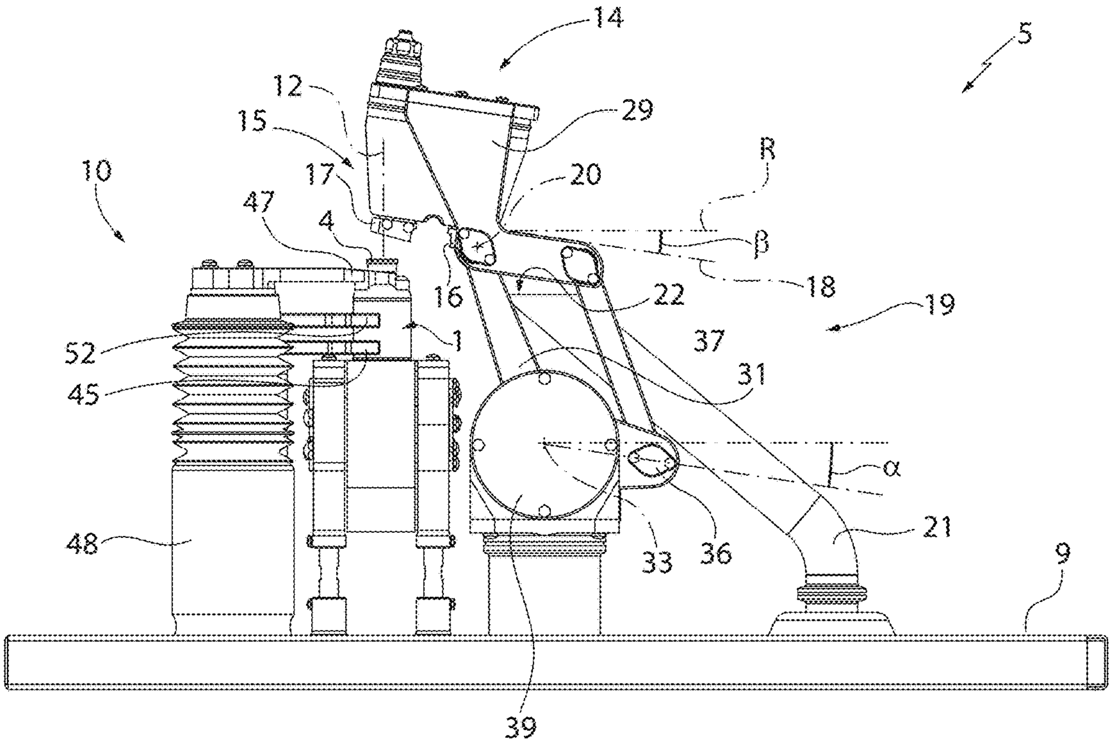

The support arms 31 and 32 (only the arm 31 is visible in FIGS. 5 to 10) are rotated about the axis 33, counterclockwise on the plane of FIGS. 5 to 11, so as to move the gripping head 14 towards the bottle 1. Moreover, the arm 36 is rotated about the axis 33, but in the opposite direction with respect to the support arms 31 and 32 (clockwise), according to a predefined angular movement α to rotate the gripping head 14 about the axis 20 so as to raise the jaw 17 with respect to the jaw 16, i.e. make the axis 18 simply transverse to the axis 12 (FIG. 6). The angular movement α of the arm 36 corresponds to a certain angle β formed between the axis 18 and the reference direction R.

Figure 7:
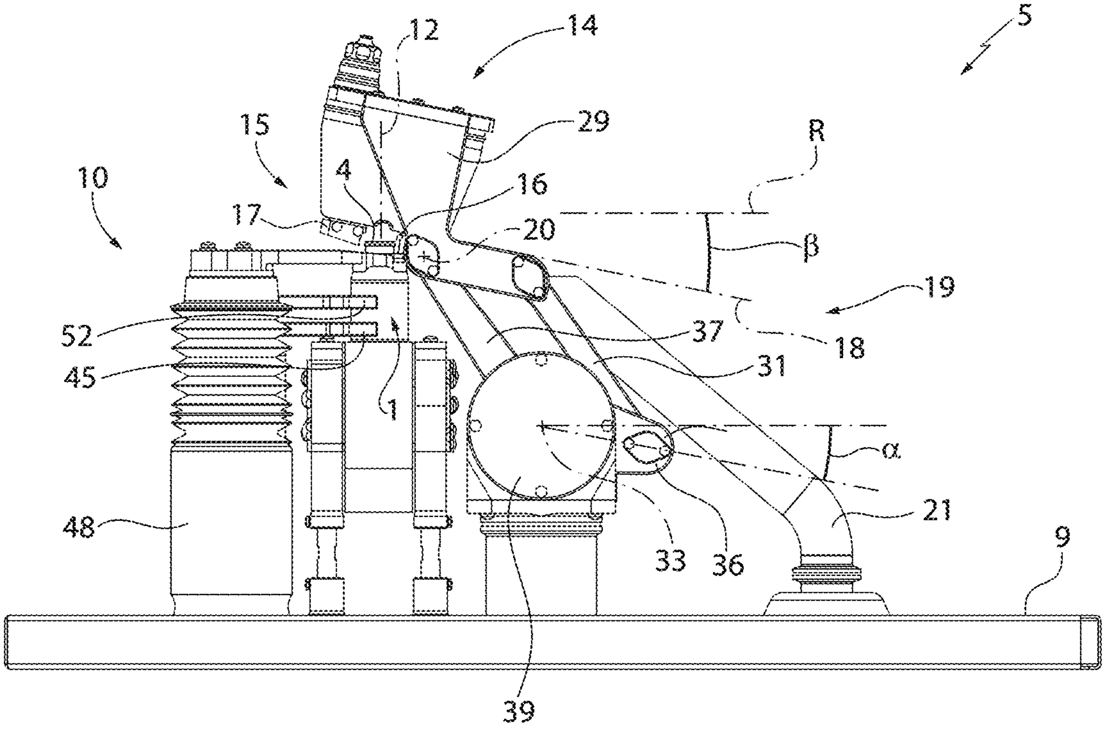

The movement of the gripping head 14 towards the bottle 1 continues, while keeping the axis 18 inclined by the angle β, until the gripper 15 is placed with the jaws 16 and 17 substantially around the cap 4 of the bottle 1 (FIG. 7).

Figure 8:
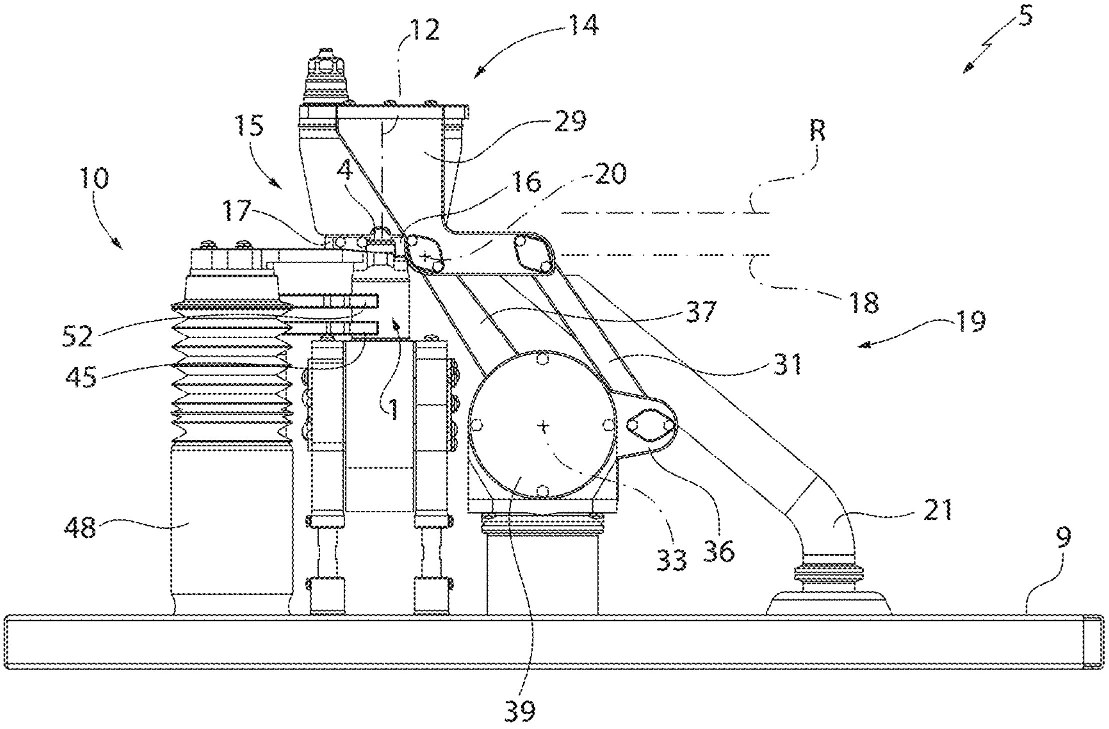

At this point, the arm 36 is rotated back (counterclockwise) by the same angular movement α in order to rotate the gripping head 14 about the axis 20 so that its axis 18 is again perpendicular to the axis 12, i.e. parallel to the reference direction R, so that the gripper 15 is placed with the jaws 16 and 17 on opposite sides of the cap 15, and then the gripper 15 is closed so as to grip the cap 4 (FIG. 8).

Figure 9:
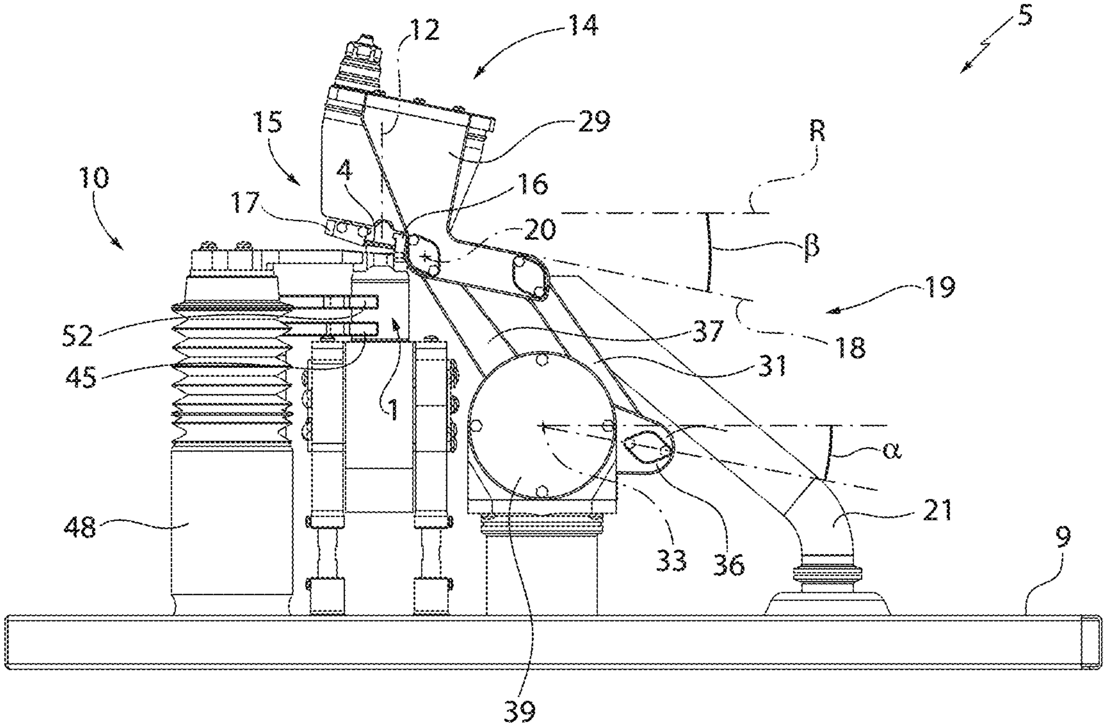

While the gripper 15 is closed, the arm 36 is rotated again in the clockwise direction of the angular movement α in order to rotate the gripping head 14 about the axis 20 so as to raise the jaw 17 with respect to the jaw 16, i.e. incline the axis 18 by the angle β again, so as to lift the cap 4 from the ferrule cap 3 substantially only at the jaw 17 (FIG. 9).

Figure 10:
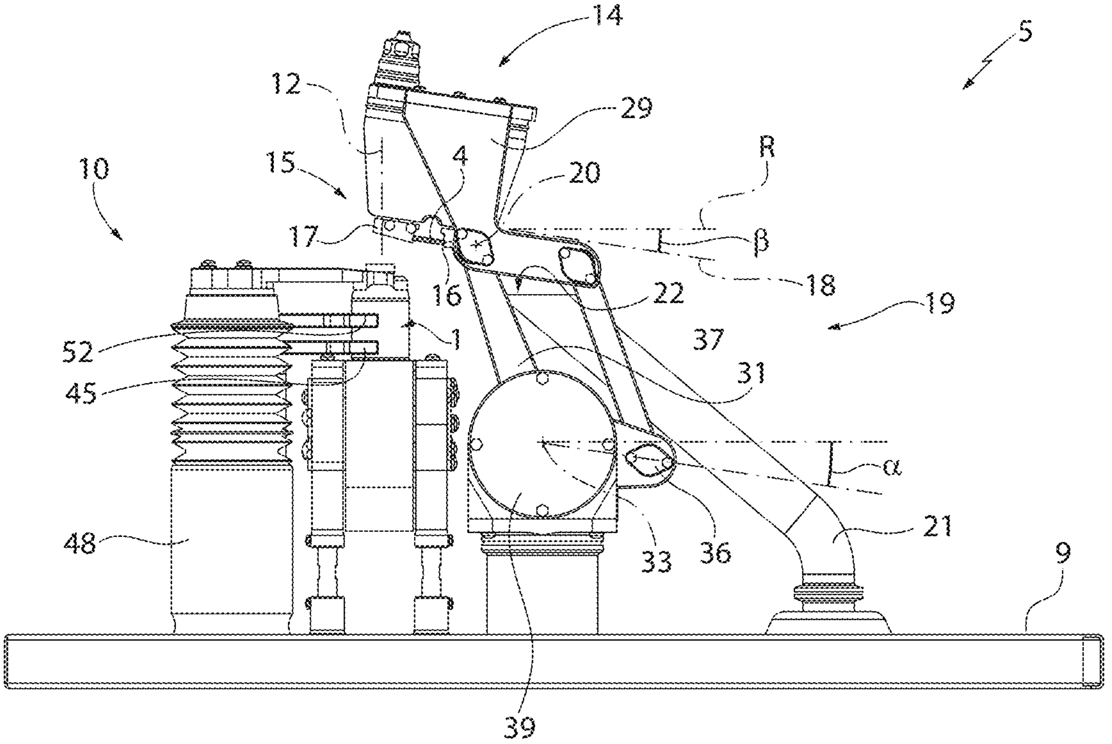
Figure 11:
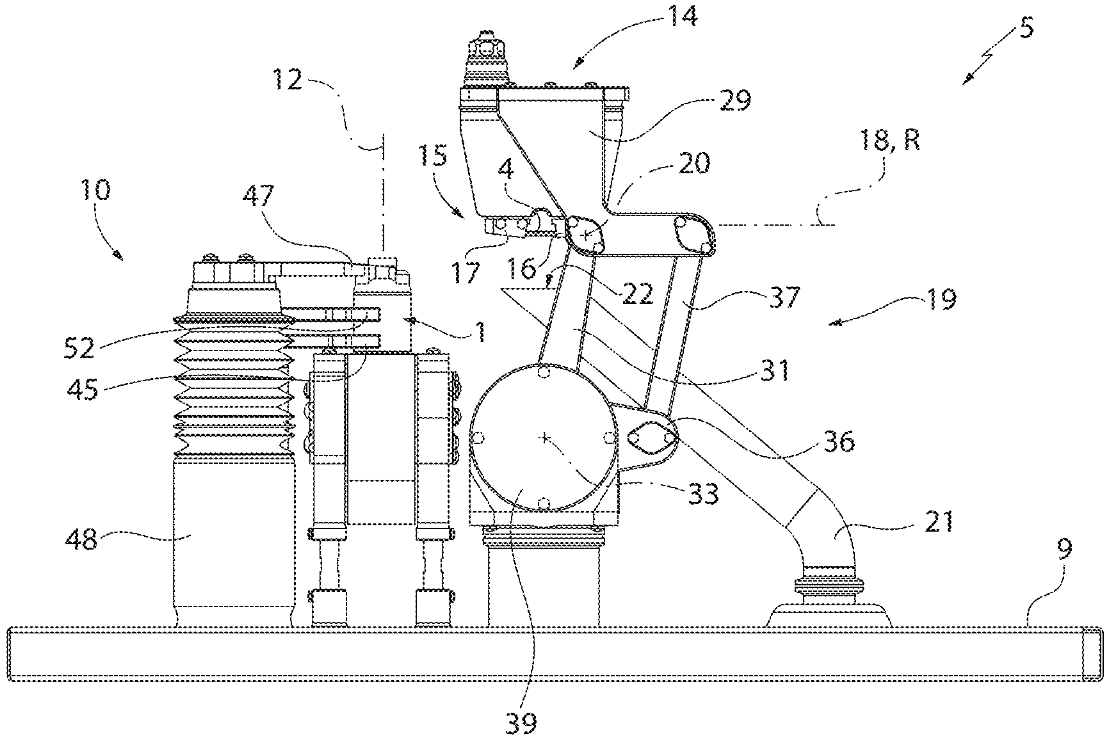

At this point, the support arms 31 and 32 are rotated back, i.e. clockwise, about the axis 33, so as to move the gripping head 14 away from the bottle 1, while the arm 36 remains stationary. Therefore, as it moves away from the bottle 1, the gripping head 14 remains rotated and, consequently, the axis 18 remains inclined, thus causing a removal of the cap 4 by a pulling movement similar to the one that would be performed manually by an operator (FIG. 10).

The clockwise rotation of the support arms 31 and 32 continues in order to carry the gripping head 14 back towards the discharging pipe 21 and when the discharging head 14 is located above the discharging pipe 21, the arm 36 is rotated again in the counterclockwise direction of the angular movement α in order to again make the axis 18 preferably perpendicular to the axis 12 (FIG. 11), thus bringing the gripping head 14 back into the initial position, in particular with the gripper 15 placed above the inlet port 22 of the discharging pipe 21.

At this point, the gripper 15 is opened to release the cap 4, which, falling, enters the discharging pipe 21 through the inlet port 22.

Although the invention described in the foregoing makes particular reference to a very precise embodiment example, it is not to be considered limited to such embodiment example, falling within its scope all those variants, modifications or simplifications covered by the appended claims, such as for example:

- the frame 28 only has the side portion 29 and there is only the support arm 31, so that the handling system 19 has a simpler and lighter structure, even if less robust and mechanically less balanced; or
- instead of the handling system 19, there is a different handling system which comprises an overhead crane placed above the belt conveyor 8, for supporting and moving the gripping head 14 to and from the bottle 1, and in particular between a first position, in which the gripper 15 is above the bottle 1, and a second position, in which the gripper 15 is above the discharging pipe 21, a first actuator mounted, together with the gripping head 14, on the carriage of the overhead crane in order to lower the gripping head 14 from the first position until the gripper 15 is placed with its jaws 16 and 17 substantially around the cap 4 of the bottle 1, and a second actuator which is also mounted on the carriage of the overhead crane in order to rotate the gripping head 14 about the axis 20 so as to lift the cap 4 from the ferrule cap 3 substantially only at the jaw 17.

The main advantage of the apparatus 5 described in the foregoing is an acceleration of the process of removing flip-off caps from bottles so as to render possible its integration in a fast industrial processing line, for example a line for manipulating pharmaceutical substances, while maintaining a gentle manner of removal, substantially analogous to a manual removal. In other words, the apparatus 5 allows automating the process of removing flip-off caps from bottles without damaging the ferrule cap or the bottle.

Another advantage of the apparatus 5 is a minimization of the risk of a microbiological contamination of the bottle 1, since the manual intervention of an operator is not required and the parts of the apparatus 5 that enter into contact with the bottle 1 such as, for example, gripper 15, ring 47 and intercepting bodies 42 and 51 of the holding system 10, looped belt 13 of the belt conveyor 8, and intercepting body 55 of the interception and handling system 25, can be manufactured with readily sterilizable or aseptic materials. For example, the gripper 15, ring 47 and intercepting bodies 42, 51 and 55 are made of stainless steel.

The invention claimed is:

1. An apparatus for removing a flip-off type plastic cap from a bottle, the bottle including a neck, a ferrule cap attached to the neck and the flip-off type plastic cap attached in a removable manner to the ferrule cap, the apparatus comprising:

a removal station including:

holding means to hold the bottle in a cap removal position, where the bottle stands on a supporting surface in the removal station with a longitudinal axis thereof coinciding with a first axis fixed with respect to the removal station and perpendicular to the supporting surface;

a gripping head provided with a gripper having a first jaw and a second jaw mutually movable along a second axis transverse to the first axis to grip the flip-off type plastic cap;

first handling means to move the gripping head to and from the bottle;

second handling means to rotate the gripping head about a third axis located on a side of the first jaw and perpendicular to a plane defined by the first axis and by the second axis; and electronic control means configured to control, in the following order, the first handling means so as to bring the gripping head closer to the bottle, the second handling means to rotate the gripping head so as to position the two jaws around the flip-off type plastic cap with the second axis perpendicular to the first axis, the gripping head to close the gripper so as to grip the flip-off type plastic cap, the second handling means to rotate the gripping head around the third axis by a certain angle such as to lift the flip-off type plastic cap from the ferrule cap substantially only at the second jaw, and the first handling means to move the gripping head away from the bottle while the gripping head remains rotated by that angle so as to remove the flip-off type plastic cap from the ferrule cap.

2. The apparatus according to claim 1, wherein the removal station includes a support base and said first handling means include at least a first arm, which has a first end connected to the gripping head and a second end connected to the support base so as to rotate around a fourth axis fixed with respect to the support base to allow the gripping head to move to and from the bottle.

3. The apparatus according to claim 2, wherein said first handling means include a first electric motor fixed to the support base and suited to rotate a shaft thereof about said fourth axis; said other end of the first arm being fitted to the shaft of the first electric motor.

4. The apparatus according to claim 2, wherein said second handling means include a joint for connecting in an articulated manner said first end of the first arm to a first point of the gripping head to enable it to rotate about the third axis, a second arm, which has a first end connected to said support base so as to rotate about said fourth axis independently of said first arm, and a third arm, which connects a second end of the second arm in an articulated manner to a second point of the gripping head so that a rotation of the second arm about the fourth axis produces a corresponding rotation of the gripping head about the third axis.

5. The apparatus according to claim 4, wherein the first and second points of the gripping head being aligned parallel to the second axis.

6. The apparatus according to claim 4, wherein said second handling means include a second electric motor, which is fixed to the support base and has a shaft capable to rotate around said fourth axis; said first end of the second arm being fitted on the shaft of the second electric motor.

7. The apparatus according to claim 1, wherein said gripping head includes an electric actuator to close and open said gripper.

8. The apparatus according to claim 1, wherein said holding means include a ring movable coaxially to said first axis between a raised position, wherein the ring is above said ferrule cap to release the bottle, and a lowered position, wherein the ring is fitted around the neck of the bottle to retain the bottle in said cap removal position.

9. The apparatus according to claim 8, wherein said removal station includes a support base and said holding means include a first actuator fixed to the support base and suited to move said ring between said raised position and said lowered position.

10. The apparatus according to claim 9, wherein said first actuator is electropneumatic.

11. The apparatus according to claim 1, further comprising a belt conveyor, which defines said supporting surface and is suited to advance the bottle through the removal station in an advancing direction transverse to said plane so as to transfer the bottle into said cap removal position.

12. The apparatus according to claim 11, wherein said holding means include an intercepting body, which is movable to and from an intercepting position, wherein the intercepting body is placed on or above said supporting surface, transverse to the advancing direction, to stop the bottle in said cap removal position, while the belt conveyor tends to advance the bottle.

13. The apparatus according to claim 12, wherein said removal station includes a support base and said holding means include a second actuator fixed to the support base and suited to move said intercepting body to and from said intercepting position.

14. The apparatus according to claim 1, wherein said removal station includes a discharging pipe with an inlet port facing upwards; said first handling means being suited to move the gripping head between a first position, where the gripper is above the bottle to remove the flip-off type plastic cap, and a second position, where the gripper is above the inlet port to discharge the flip-off type plastic cap by gravity.

15. The apparatus according to claim 14, wherein said electronic control means are configured to control said first handling means to move the gripping head so as to position the gripper with the second axis perpendicular to the first axis when the gripping head is in the second position, and to control the gripping head to open the gripper so that the flip-off type plastic cap falls into said inlet port.

* * * * *